United States Patent [19]

Willingham

[11] Patent Number: 5,078,328

[45] Date of Patent: Jan. 7, 1992

[54] POULTRY LITTER DISINTEGRATING MACHINE

[75] Inventor: Jack Willingham, Mt. Pleasant, Tex.

[73] Assignee: Priefert Mfg. Co., Inc., Mt. Pleasant, Tex.

[21] Appl. No.: 559,719

[22] Filed: Jul. 30, 1990
(Under 37 CFR 1.47)

[51] Int. Cl.⁵ ............................................. B02C 21/02
[52] U.S. Cl. ............................ 241/101.7; 241/186.3; 241/189 R; 241/193; 241/194
[58] Field of Search ............... 241/101.7, 186 R, 193, 241/194, 189 R, 195, 186.2, 186.3

[56] References Cited

U.S. PATENT DOCUMENTS

| | | | |
|---|---|---|---|
| 2,539,136 | 1/1951 | Hite | 241/101.7 |
| 3,190,064 | 6/1965 | Wenzel et al. | 241/194 X |
| 3,815,823 | 6/1974 | Johnson | 241/190 X |
| 4,619,412 | 10/1986 | Wellingham | 241/101.7 |
| 4,708,294 | 11/1987 | Endom | 241/101.7 X |
| 4,711,403 | 12/1987 | Gregory, Sr. et al. | 241/101.7 X |
| 4,854,507 | 8/1989 | Smith | 241/194 X |

*Primary Examiner*—Mark Rosenbaum
*Assistant Examiner*—Frances Chin
*Attorney, Agent, or Firm*—Kent A. Herink; Brian J. Laurenzo; Rudolph L. Lowell

[57] ABSTRACT

The litter disintegrating machine is tractor drawn over a poultry raising area. Ripper teeth extended forwardly of and mounted on the side walls of the machine act with the forward edges of the side walls to provide a section of litter for travel between the side walls. On advance of the machine, the section of litter between the side walls is acted upon by a rotary flail unit extended between and mounted on the side walls rearwardly of the ripper teeth for disintegration and discharge back to the ground floor for reuse. The density of the discharged litter material may be varied by varying its rate of discharge from the machine.

4 Claims, 3 Drawing Sheets

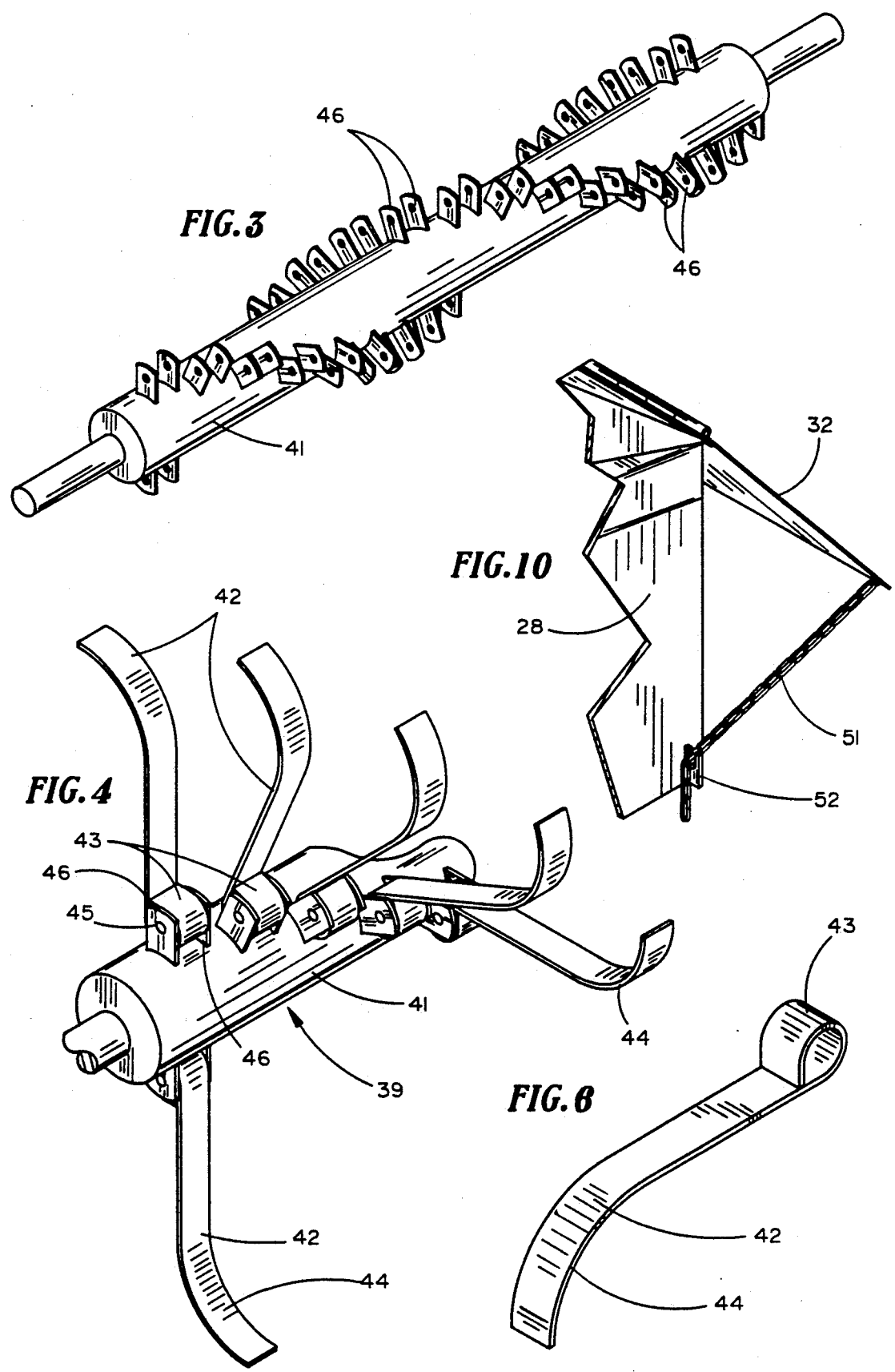

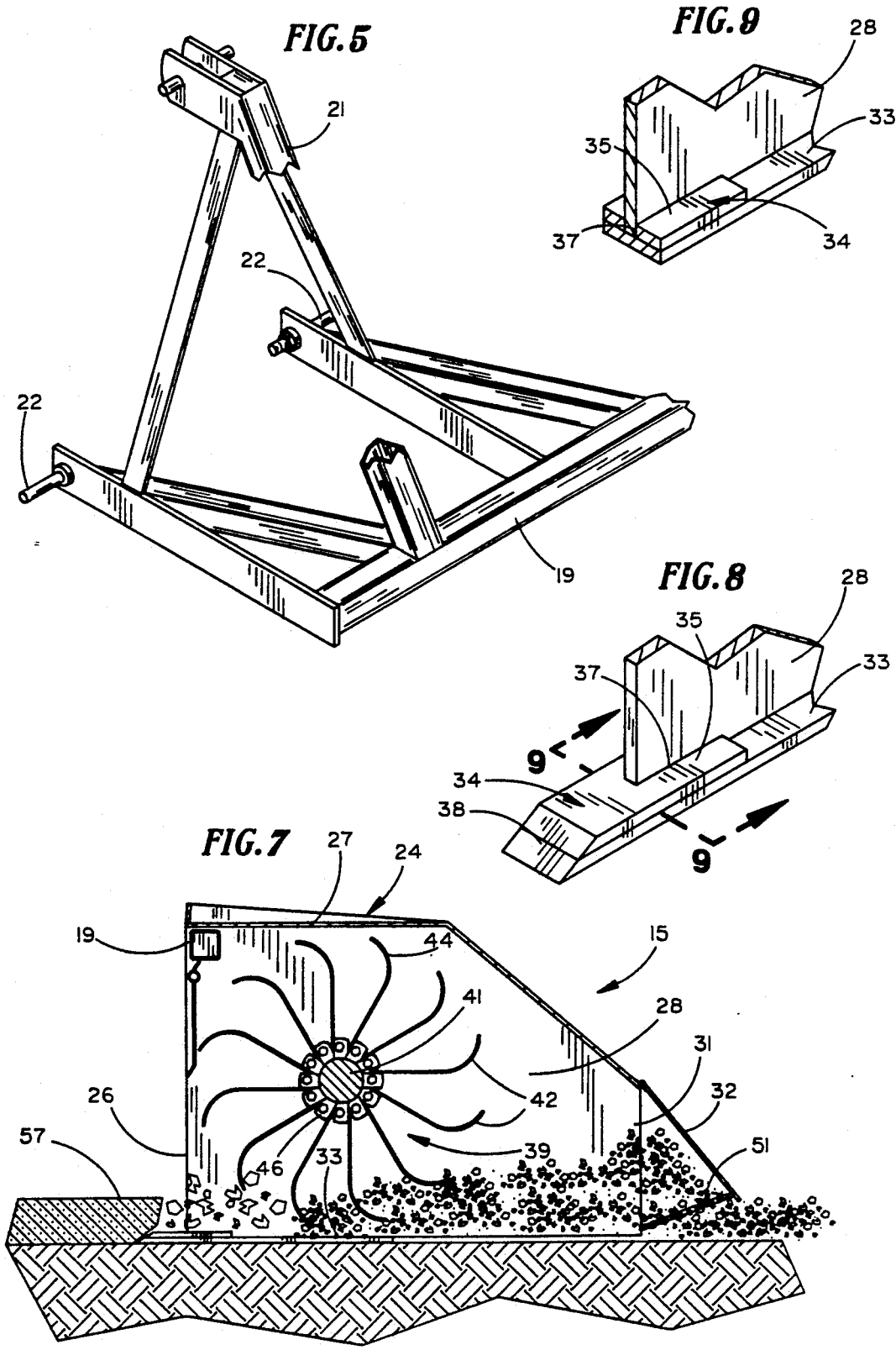

POULTRY LITTER DISINTEGRATING MACHINE

This invention relates generally to a machine for disintegrating poultry litter accumulated over the ground surface of a poultry raising area and, in particular, to a machine for disintegrating poultry litter that is loosened from the ground surface forwardly of a flail unit.

BACKGROUND OF THE INVENTION

Poultry litter disintegrating machines now in commercial use that utilize flail units or rotors for comminuting the litter are shown, for example, in U.S. Pat. Nos. 4,619,412 and 4,708,294. In these machines, a rearwardly and upwardly inclined scraper blade is positioned forwardly of and over the full axial length of the flail rotor. As the machine is advanced, the blade scrapes a layer of the litter from the poultry floor which layer then moves rearwardly and upwardly along the inclined scraper blade into the operating zone of the rotor flail members, which disintegrate the litter as it moves rearwardly off the upper edge of the scraper blade. During this operation, gouging or digging of the scraper blade into the ground surface is prevented by setting the leading edge of the blade a predetermined distance above the ground surface. The cutting and lifting of the litter from the ground surface requires not only appreciable power, but care must be used in retaining the ground adjustment of the blade.

SUMMARY OF THE INVENTION

The litter disintegrating machine of this invention for conditioning the floor of a poultry raising area has a housing with an open front side, closed end walls and a rear wall having a discharge opening equipped with a pivoted door member which is adjustable to provide a variable discharge area in the rear wall. The lower edge of each end wall carries a skid plate having a litter ripper tooth projected forwardly of an associated end wall. A rotational flail unit extends between and is rotatably supported on the end walls. On rotation of the flail unit, the terminal ends of pivotally connected flail members move in an arcuate path having a lower portion spaced about one inch above the skid plates.

On advance of the disintegrator, and with the skid plates rideable on the floor surface of the poultry area, the ripper teeth cut into the layer of litter so as to leave the litter between the teeth on the floor surface to be pulverized or disintegrated by the flail rotor passing thereover. By virtue of the one inch clearance of the rotating flail members with the skid plates, gouging or digging into the ground surface of the poultry area is eliminated.

Residence time of the litter material in the housing being acted upon by the flail may be varied by adjusting the size or area of the litter discharge opening with an increase in residence time providing for an increased comminution of the litter prior to the discharge thereof. By utilization of the transversely spaced ripper teeth to cut the litter for travel of a section of the litter between the end walls of the machine and the advance of the flail unit directly over such litter section, the machine is operated with a minimum of power and improved tracking of the skid plates on the ground surface of the poultry raising area.

BRIEF DESCRIPTION OF THE DRAWINGS

FIG. 3 is a perspective view of the flail unit shaft showing only the assembly therewith of the flail member connector members and illustrating their full spiral extension over the length of the shaft.

FIG. 4 is a detailed perspective view of an end portion of the flail unit shaft with pivotally mounted flail members.

FIG. 5 is a perspective view, with parts broken away, of the tractor hitch attachment for supporting the disintegrator machine.

FIG. 6 is an enlarged perspective view of a flail member.

FIG. 7 is a vertical sectional view as seen along lines 7—7 in FIG. 1.

FIG. 8 is an enlarged detail perspective view showing the assembly of a skid plate and ripper tooth unit with an associated end wall of the machine, and FIG. 9 is a sectional view as seen along the line 9—9 in FIG. 8.

FIG. 10 is a cover member connected by a chain member.

DETAILED DESCRIPTION

Figure 1:
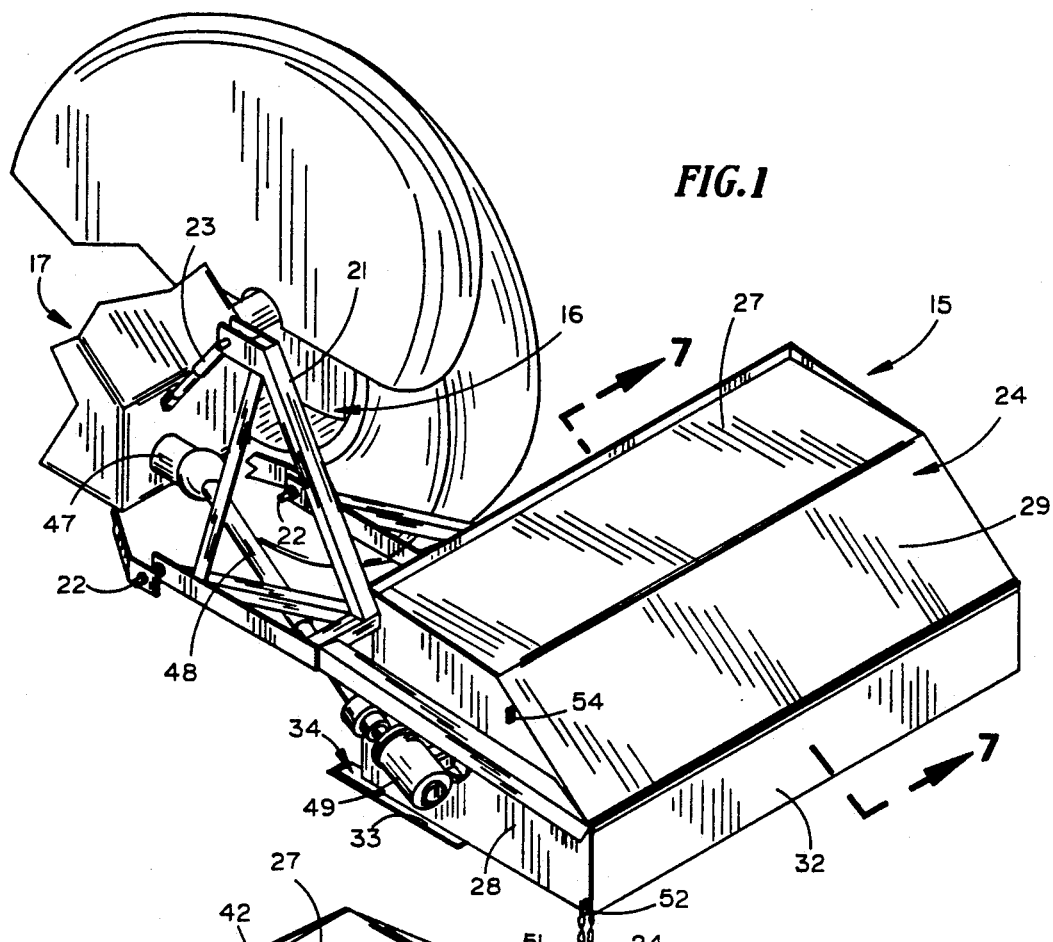
FIG. 1 is a rear perspective view of the poultry litter disintegrating machine of this invention shown in assembly relation with a towing tractor.
Figure 2:
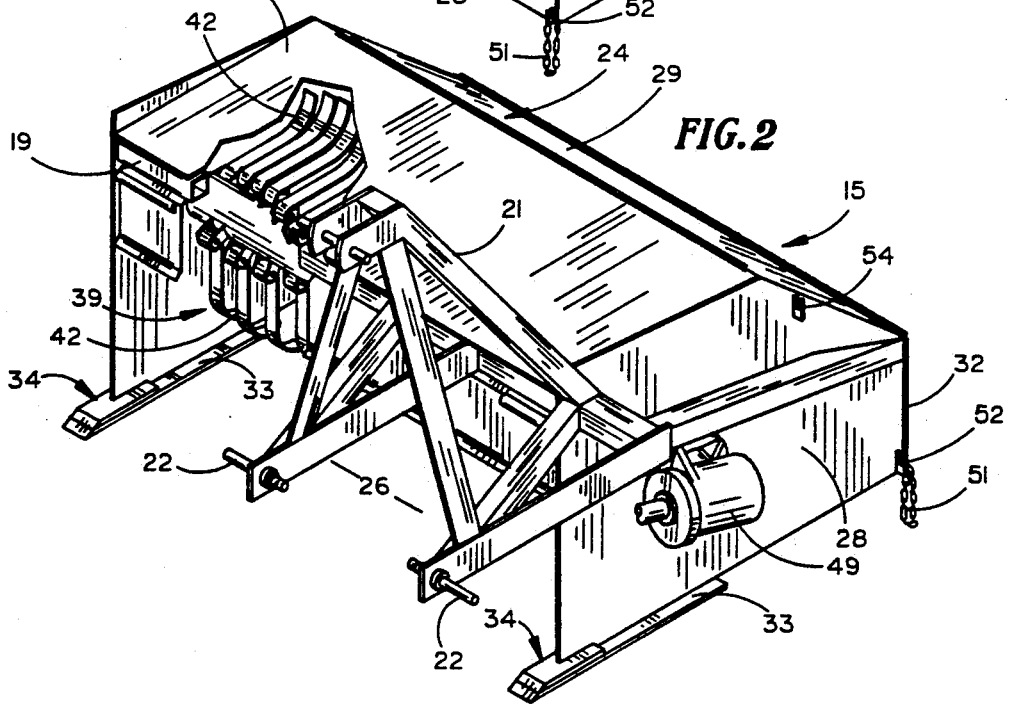
FIG. 2 is a front perspective view of the machine.

Referring to FIGS. 1 and 2 of the drawings, the disintegrating machine of this invention, indicated generally at 15, is shown in assembly relation with the rear end portion 16 of a tractor 17. The machine 15 projects laterally from one side of the tractor 17 and includes an upper front frame bar 19 to which is rigidly secured a three-point hitch 21 (FIGS. 1 and 5). The unit assembly of the machine 15 and hitch 21 is pivotally supported at 22 on the tractor 17 for up and down movement in response to the actuation of an extensible link or hydraulic cylinder 23.

The machine 15 includes a housing 24, formed of a sheet metal material, having an open front side 26 (FIG. 2). A top wall 27, vertical end walls 28, and a rearwardly and downwardly inclined rear wall 29 are secured to the frame bar 19. The rear wall terminates upwardly from the lower ends of the side walls 28 to form a litter discharge opening 31 extended transversely of the housing 24. An adjustable cover or door member 32 pivotally suspended from the bottom edge of the rear wall 29 is movable to opened and closed positions relative to the discharge opening 31 to vary the rate of material discharge from the machine.

Each end wall 28 is equipped with a ground runner 33 secured as by weldments to the bottom edge thereof and formed at its forward end with a ripper tooth 34 that projects forwardly from the front edge of an associated end wall 28. The runner 33 and ripper tooth 34 are formed as in integral unit from a flat strap metal material. A top portion 35 of the tooth is comprised of a short piece of material formed with a rearwardly open slot 37 of a size to receive therein the front lower corner of an end wall 28. The tooth portion is superposed over the front end portion of the runner 33 and secured thereto by weldments after which the front surfaces of the runner 33 and of the tooth portion 34 are formed with a continuous upwardly and rearwardly inclined tooth surface 38. With the front lower corner of the end wall 28 received within the slot 37, the tooth top portion 34 and the runner 33 are welded securely to the end wall 28.

Within the housing 24 and extended between the end walls 28 is a flail unit assembly 39 that includes a shaft 41, the ends of which are rotatably supported in adjacent end walls 28. As shown in FIGS. 3 and 4, the assembly 39 has flail members 42 arranged in two rows, each of which extends in a complete spiral axially of the shaft 41. Each flail member 42 (FIGS. 4 and 6) is formed from a single piece of a strap metal material into a generally J-shape with a tubular bearing portion 43 at one end and an arcuate portion 44 at the opposite end thereof. The bearing 43 is pivotally supported on a pin 45 extended between and supported on an associated pair of ears or lugs 46 projected radially from the shaft 41 and defining the spiral arrangement of the flail members 42.

As best shown in FIG. 7, on rotation of the flail unit 39 and resultant radial projection of the flail members from the shaft 41, the terminal ends 44 of the flail members travel in an arcuate path, the lower portion of which is spaced about one inch above the upper surface of the ground runners 33. The flail unit 39 (FIG. 1) is driven from the power take-off 47 of the tractor 17 which is connected through a telescopic shaft 48 with a gear unit 49 secured to an end wall 28 in driving engagement with the shaft 41.

In operation, the machine 15 is adjusted vertically on actuation of the extensible link 23 of the hitch attachment 17 so that the runners 33 are in slidable contact with the ground in the poultry area. As the tractor advances along the ground, the ripper teeth 34 engage the litter forwardly of the end walls 28, which cooperate with the teeth 34 to cut a section of the litter for travel between the end walls 28 into the working or disintegrating zone of the flail unit 39. As the flail unit travels over the litter section, the litter located about one inch above the floor surface is engaged by the flail members 42 and reduced into a communited form for discharge through the rear wall opening 31 for return to the ground of the poultry raising area for reuse or for removal by a front endloader or the like. The extent of comminution of the litter can be varied by adjustment of the cover member 32. Referring to FIGS. 1, 2 and 10, each end of the cover member 32 is connected by a chain or like member 51 to the rear end of an adjacent end wall 28 having a notched locking member 52. The open position of the cover 32 is thus adjustable by the reception of a link of the chain 51 within the member 52, it being understood the cover 32 is movable to an adjusted position by the litter material being discharged as the machine is advanced. Comminution of the litter material is increased on adjustment of the door 32 toward its closing position with the discharge opening 31, which increases the residence time of the material within the housing 24 to be acted upon by the flail members 42.

It is seen, therefore, that the close set spiral arrangement of the flail members between the end walls 28 and the directing of a section of the litter material between the end walls by the ripper teeth, followed by the cutting and beater action of the terminal end portions of the flail members, produces a uniform consistency in size of the communited material.

Although the invention has been described with respect to a preferred embodiment thereof, it is to be understood that it is not to be so limited since changes and modifications may be made therein within the scope of the appended claims.

I claim:

1. A machine for disintegrating poultry litter accumulated as a covering layer on the ground surface of a poultry raising area comprising:
   (a) a housing enclosure having a pair of transversely opposite upright end walls with lower edges, and a top wall to provide an open forward side and an open bottom side;
   (b) an elongated longitudinal ground runner secured to and extended linearly along the lower edge of each end wall, each ground runner having a top surface and a front litter-ripping tooth projected forwardly from an associated side wall;
   (c) a flail unit within the housing extended between said end walls and including a shaft rotatably mounted on said end walls; and
   (d) litter disintegrating flail members pivotally mounted on said shaft in an axially spaced relation with the circular path defined by the terminal ends of said flail members, on rotation of said flail unit, having a bottom portion spaced a predetermined distance above the top surfaces of said ground runners, whereby on a forward advance of the housing enclosure the flail members disintegrate the litter located between the end walls and the top surfaces of said ground runners.

2. A machine for disintegrating poultry litter according to claim 1 wherein:
   (a) said flail members are arranged in at least one row helically extended about said shaft over the axial length of said shaft.

3. A machine for disintegrating poultry litter according to claim 2 wherein:
   (a) each flail member is comprised of a flat arm member pivoted at one end on said shaft and of an arcuate shape extended radially from said shaft with the concave side thereof constituting a leading face thereof during rotation of the flail unit.

4. A machine for disintegrating poultry litter according to claim 1 wherein:
   (a) said housing enclosure has a rear material discharge opening extended transversely between the side walls thereof;
   (b) a cover member for said discharge opening;
   (c) means pivotally supporting the cover member on the housing enclosure for movement from an upright suspended position in a covering relation with said opening to a position inclined downwardly and rearwardly from said supporting means; and
   (d) means for limiting the pivotal movement of said cover member to various rearwardly inclined positions therefor to vary the residence time of the litter between said end walls whereby to control the comminution of the litter moved through said discharge opening by said flail unit on a forward advance of said machine.

* * * * *